United States Patent

Fletcher

[11] Patent Number: 6,056,549
[45] Date of Patent: May 2, 2000

[54] COMMUNICATION SYSTEM AND ASSOCIATED APPARATUS

[76] Inventor: Cheri Fletcher, 12035 NE. 2nd Ave., #A-318, North Miami, Fla. 33161

[21] Appl. No.: 09/070,902

[22] Filed: May 1, 1998

[51] Int. Cl.[7] .......................... G09B 21/00; G09B 19/00; A63H 33/38

[52] U.S. Cl. .......................... 434/112; 434/156; 434/236; 446/147; 283/46

[58] Field of Search .................................. 434/112, 156, 434/167, 170, 185, 236, 322, 433; 446/147, 149, 901; 281/15.1, 29, 37; 283/46, 117

[56] References Cited

U.S. PATENT DOCUMENTS

| | | | |
|---|---|---|---|
| 520,399 | 5/1894 | Purdy | 283/42 |
| 556,467 | 3/1896 | Koerner | 434/172 |
| 1,217,632 | 2/1917 | Pritchard | 273/157 R |
| 1,533,122 | 4/1925 | Lederer | 434/97 |
| 2,538,085 | 1/1951 | Cotton | 434/178 |
| 3,715,816 | 2/1973 | White | 434/429 |
| 4,063,369 | 12/1977 | Hart | 434/156 |
| 4,165,890 | 8/1979 | Leff | 283/7 |
| 4,465,465 | 8/1984 | Nelson | 434/112 |
| 4,556,390 | 12/1985 | Rahn et al. | 434/433 |
| 4,650,423 | 3/1987 | Sprague et al. | 434/156 |
| 4,684,348 | 8/1987 | Raynor | 434/156 |
| 4,702,700 | 10/1987 | Taylor | 434/168 |
| 4,761,633 | 8/1988 | Leff et al. | 340/286.07 |
| 4,802,855 | 2/1989 | Wood | 434/157 |
| 4,846,687 | 7/1989 | White et al. | 434/112 |
| 4,907,904 | 3/1990 | Baldwin | 402/80 |
| 4,915,632 | 4/1990 | Leff et al. | 434/112 |
| 5,013,245 | 5/1991 | Benedict | 434/170 |
| 5,152,690 | 10/1992 | Todd | 434/113 |
| 5,380,111 | 1/1995 | Westrom | 402/74 |
| 5,533,902 | 7/1996 | Miller | 434/112 |
| 5,580,254 | 12/1996 | Ramsey | 434/236 |
| 5,765,875 | 6/1998 | Rowley | 283/74 |
| 5,827,103 | 10/1998 | Carter | 446/71 |
| 5,857,706 | 1/1999 | McQueeny | 281/29 |
| 5,895,219 | 4/1999 | Miller | 434/178 |

FOREIGN PATENT DOCUMENTS

| | | | |
|---|---|---|---|
| 2197592 | 5/1988 | United Kingdom | 446/147 |

*Primary Examiner*—Paul J. Hirsch
*Assistant Examiner*—Michael B. Priddy
*Attorney, Agent, or Firm*—Malloy & Malloy, P.A.

[57] ABSTRACT

A communication and teaching aid for increasing the communication skills of a nonverbal, speech and/or language impaired individual comprising a collection assembly preferably in the form of a book structure having a plurality of movably mounted pages each of which serves as a support structure for a plurality of demonstration pieces. Informative indicia is formed on an exposed surface of each of the demonstration pieces either in the form of an alpha-numeric display or a pictorial representation with a word or phrase label, wherein the informative indicia is representative of subject related categories of common objects, activities, statements, phrases, questions, answers, etc. A coding system is utilized to identify each of the plurality of demonstration pieces by category so as to facilitate their accessibility and identity when at least one demonstration piece of a given category is desired to be used either by the individual or one communicating with or teaching the individual. In use, the impaired individual or one communicating with or teaching that individual, chooses one or more of the demonstration pieces so as to create an expressive communication. The collected demonstration pieces are then removably attached in a cooperative array on a primary display portion of the collection assembly, wherein the cooperative array defines a question or statement intended by either the individual or the one communicating with him/her.

22 Claims, 4 Drawing Sheets

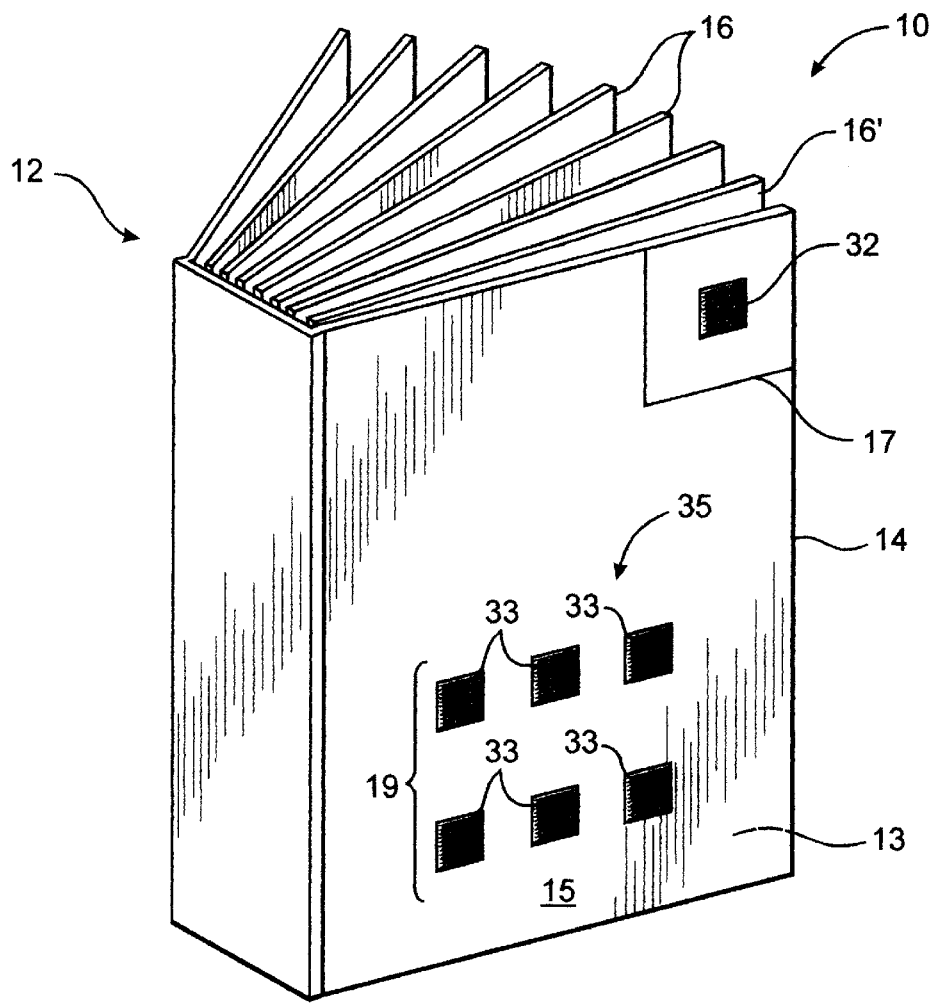
FIG. 1
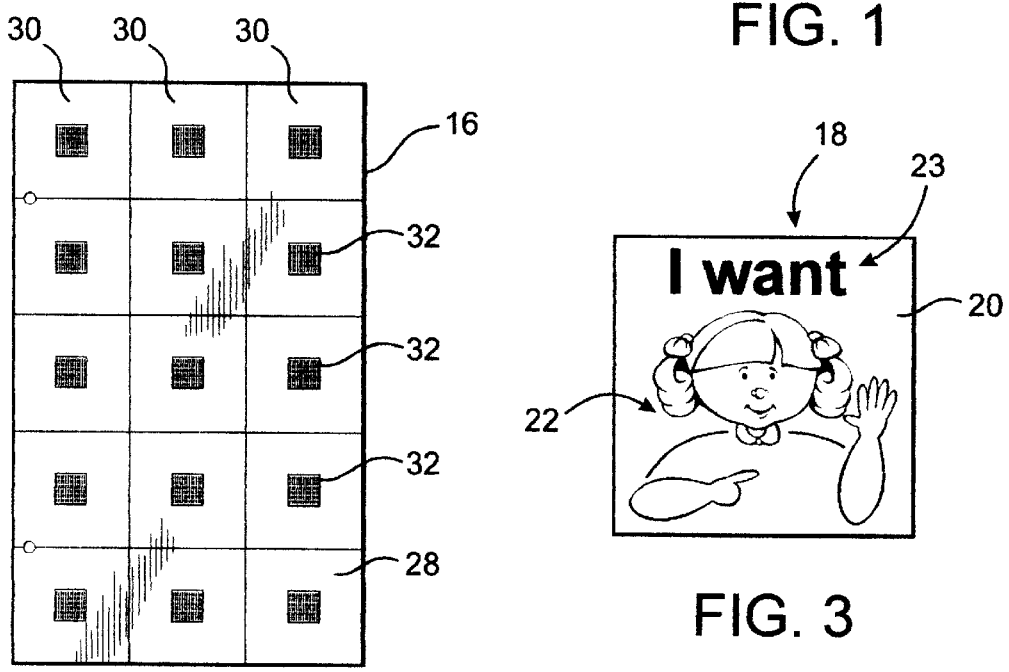
FIG 2
FIG. 3

COMMUNICATION SYSTEM AND ASSOCIATED APPARATUS

BACKGROUND OF THE INVENTION

1. Field of the Invention

This invention relates to a communication and teaching system including a communication aid to facilitate and improve the communication skills of nonverbal, speech and/or language impaired individuals and a method for implementing the system. The communication and teaching system of the present invention is specifically designed to be user-friendly and to be readily adaptable for use by individuals having a mental level sufficient to distinguish and/or differentiate informative indicia in the form of pictorial representations and/or alphabetical or numeric displays, as well as some manual motor ability in order to physically manipulate structural components which make up the system.

2. Description of the Related Art

It has long been recognized that individuals who are either non-verbal or speech-impaired and/or autistic individuals have many problems in terms of communicating with others, not to mention communicating their basic needs and desires. Attempts have been made in the art to improve the communication skills and/or the effective semantic and/or syntactic skills of such individuals, which include devices and techniques geared towards establishing communication but also towards aiding the individual with developing an increased vocabulary, morphology and syntax which would enable him/her to communicate with others on at least some minimal but effective level.

One problem associated with increasing the communication skills of verbally challenged individuals is the wide range of mental levels of individuals affected with such handicaps. For example, the more mentally aware one of these individuals is, the easier it is to open lines of communication by utilizing relatively conventional devices such as books, drawings, flash cards and other more specialized or unique apparatus. However, the utilization of such known devices assumes that the challenged individual possesses certain "normal" communicative skills, such as reading or that the individual has the mental facilities to recognize basic emotions including anger, sadness, etc. In addition, many of these known devices are directed to increasing a challenged individuals capabilities in a certain area, such as reading, mathematics, spelling, and psychotherapeutic communication and in general, and are not directed to enhancing the overall ability of the individual to communicate, linguistically or otherwise.

While known communication improving devices of the type set forth above may be considered to be effective for their intended purposes, it is generally acknowledged that they are somewhat deficient in the establishment of lasting communicative skills which allow a verbally challenged individual to communicate both in an expressive and receptive manner, while at the same time, continuously increasing the individual's effective vocabulary with the additional advantage of allowing the individual to create his or her own communicative "statements."

Accordingly, there is a need in the field of teaching and communication aids for a system, method and associated apparatus directed to verbally challenged individuals which are capable of use despite the wide range of the mental levels possessed by such individuals. Preferably, any such system, method and associated apparatus should also serve to greatly increase the individual's effective vocabulary, syntax and/or morphology and functional pragmatic skills, and even more preferably, should be adaptable for use by individuals facing a variety of challenges, including but not limited to non-verbal individuals as well as those suffering from autism, cerebral palsy, mental deficiency, etc. or any combination of these afflictions. Any such communication system, method and apparatus should also be readily used in combination with other well-accepted and effective educational communication aids, techniques and/or programs, and further, should enhance the receptive and expressive language skills which include semantics, syntax and/or morphology and functional pragmatic skills, even though the individual may be non-verbal, speech-impaired and/or language impaired. Given the challenges faced by these types of individuals, any such communication system should also be "user friendly" in terms of the design of the apparatus and various components associated therewith, so as to be easily recognizable and accessible by the individual utilizing the system and apparatus. In addition, any such communication and/or teaching system, method or apparatus should have sufficient versatility so as to promote inter-disciplinary "team" action between the challenged individual, an occupational therapist and a speech pathologist, and should also be adaptable to the specific needs and limitations of challenged individuals having unique or less common communicative restrictions or challenges. Finally, any such system should also provide a substantially organized and variable structure which is easy for a user to identify and implement, so as to render it readily useable in an ongoing communicative environment and so as to improve the organization skills of the challenged individual.

It would be ideal if any such communication system were developed which could also address the needs of such individuals who have the mental ability to discriminate pictures, to comprehend the written word, written phrases and/or sentences, and who have the motor coordination skills so as to permit such individuals to mentally and manually manipulate apparatus associated with such a system to utilize pictures, words, or commonly used phrases to convey a message to another, namely, to a recipient or "listener". It would also be ideal if any such communication system were also capable of being adapted for use with autistic children and mentally handicapped individuals which require and respond to structure and repetitive design. The associated and various components of any such communication system should, therefore, be designed to make it easy for such individuals to use and thereby, increase both communication and pragmatic skills.

SUMMARY OF THE INVENTION

The present invention has been developed to solve the needs which remain in the art, as discussed above, and specifically, is directed towards a communication and teaching system and apparatus designed to increase the communication skills of non-verbal, speech impaired and/or language impaired individuals, as well as a method of implementation thereof. More specifically, the present invention includes a collection assembly, preferably in the form of a book structure, which may comprise a note-book or even an open and closeable ring binder type of book structure. In any event, the preferred book structure of the collection assembly should include an outer cover disposed in secured, surrounded relation to a plurality of movably connected support structures, which are preferably in the form of pages, and which may also be removable from the book structure, if desired. Each of the preferred pages serve as a support structure for the storage and selective removal for display of a plurality of demonstration pieces. In the preferred embodiment, the afore-said pages have at least one surface, but preferably two oppositely disposed surfaces, each of which define a display surface on which a number of subject-related demonstration pieces can be removably mounted. In order to facilitate the recognition, location, and easy access by an individual to the various demonstration pieces, each of the pages mounted within the book structure are grouped or segregated into a plurality of different categories. Each category is dedicated to a different subject matter and accordingly, all of the demonstration pieces within a given category are "subject related," meaning that each of the demonstration pieces include informative indicia formed on an exposed surface thereof which relate to the same general subject representative of a given category. By way of example, the subject matter of the plurality of categories may include (but would not be limited to) body parts, bathroom fixtures, clothing, food items, kitchen items, etc. Also, more sophisticated subject matter defining some of the various categories could include words and/or phrases representing questions or declarative statements as well as persons, places, things, etc. The informative indicia on the exposed surface of each of the plurality of demonstration pieces may be imprinted directly thereon or applied to a label or other material adhered thereto. Preferably, the informative indicia is in the form of pictorial images or representations which ideally but not necessarily include one or more written words to describe the image, and/or other informative indicia on the exposed surface of the demonstration pieces, which might include questions, alphabet letters, numerals, and/or a combination of both.

In order to ensure that the communication system, associated apparatus and method of the present invention is "user friendly", each of the aforementioned plurality of categories are distinguishable from one another through the provision of a coding means, which in a preferred embodiment is established through the use of color coding and/or even symbol coding. Accordingly, each of the plurality of pages defining or contained within an individual category is color coded, and/or symbol coded. Preferably, each of the subject-related demonstration pieces intended to be contained within a given category are also similarly color coded and/or symbol coded to that of the page or pages on which they are displayed and removably stored. Challenged individuals utilizing the various components to expressively communicate can more readily identify, locate, and have access to the various demonstration pieces which are desired or required to create a given communicative statement by remembering and accessing the color representative or symbol representative of a desired category. By way of example, an individual may want to communicate the fact that he is desirous of eating a particular food item such as a banana, piece of cake, etc. All food items and the pages or support structures on which the demonstration pieces are mounted are color coded with a common, easily recognizable color. Therefore, the individual would first access the appropriately colored pages within the book structure and remove subject related demonstration pieces from the display surfaces which are also marked with the same color as the pages on which they are mounted.

As will be apparent, the method involved in the utilization of the components of the communication aid of the present invention may be practiced both by the challenged individual as well as any other person or persons attempting to establish communication with such individual, including teachers, occupational therapists, speech pathologists, etc. It is important to note that the challenged individual utilizing the present invention must have sufficient cognitive ability to interpret and distinguish or differentiate the informative indicia formed on the exposed surfaces of the various demonstration pieces. However, the versatility and organization of the present invention allows it to be adapted to individuals with more unique specialized needs and requirements and/or those having less common communicative restrictions or challenges.

The preferred method of the present invention involves the individual's communicating with the communication aid by locating a target demonstration piece from its appropriate category, in which the demonstration piece and its category have the same color and/or symbol. The selected demonstration piece or pieces are then removed from each category and removably mounted in a cooperative array on a primary display portion which, in a preferred embodiment, may be the exterior face. The various, selected demonstration pieces are then arranged in the cooperative array, which can be anywhere on the exterior face of the book structure, to create the intended communication (statement, question, answer, etc.). The primary display portion, however, preferably also includes, but does not have to include, a separately designated area or segment which is primarily designed to permit the user of the communication aid it and/or "conversation" partner to quickly provide a response or answer such as "yes," "no," "maybe," etc. or even questions such as "who" "when", etc, as well as repeatedly used or commonly used phrases during a "conversation." Naturally, a responsive communication by another to the created message may be in the form of a verbal communication, should the impaired individual be able to hear and understand verbal information, but may also be in the form of a plurality of appropriate visual demonstration pieces depending upon the particular content of the original communication.

The informative indicia on the various demonstration pieces is such as to allow the person working with or teaching the challenged individual to create an individualized word-labeled pictorial display, drawing and/or word-sentence structure which may then be categorized by color and/or symbol and added to the collection of prepared demonstration pieces. This ability to have self-created informative indicia on added demonstration pieces facilitates increased functional communication of that individual's world/environment as well as the continued growth of his/her effective vocabulary, syntax, and functional pragmatic skills, even though the individual is non-verbal, speech and/or language impaired.

A primary object of the present invention is to provide a communication and teaching system which enhances the communication skills of a non-verbal, speech and/or language impaired individual in a simple and effective manner.

Another primary object of the present invention is to enhance the receptive and expressive language skills by increasing the cognitive vocabulary, syntax, and functional pragmatic skills of an individual even though he or she may be non-verbal, speech and/or language impaired.

Yet another important object of the present invention is the creation of an effective communication aid and method capable of being utilized by a challenged individual for purposes of creating receptive and expressive communication wherein the individual may be a member of any one of a large number of distinct populations which vary greatly in mental age, but with a minimum cognitive ability at the level of discriminating pictures and knowing that those pictures represent objects, people, places, etc.

It is also an important object of the present invention to provide a communication aid and method of practicing the same for promoting inter-disciplinary team action with challenged individuals, including occupational therapists and speech-language pathologists.

Still another important object of the present invention is the creation of a communication aid and method which is readily adaptable to a more specialized or individualized group having relatively unique or less common communicative restrictions or challenges while always having the versatility to accommodate the special needs of each individual.

Yet another object of the present invention is to provide a communication system and associated apparatus which is readily adaptable for use in combination with other proven and accepted educational techniques and/or programs successful in the area of establishing communication with individuals who may be speech and/or language impaired, and/or nonverbal individuals, i.e., mentally handicapped, autistic, nonverbal physically impaired, hearing impaired, or those with a combination of these impairments, etc.

An advantage of the present invention is that it helps the organizational skills of such impaired individuals.

Yet another advantage of the present invention is that it helps to provide a sense of structure which is particularly important with respect to autistic individuals, as many of such individuals seem to need structure in order to feel comfortable.

Another object of the present invention is to provide a communication aid and method which is sufficiently organized to meet the needs of the individual user so as to be more versatile, effectively used and more readily accepted by a potential user.

These and other objects, features and advantages of the present invention will become more clear when the drawings as well as the detailed description are taken into consideration.

BRIEF DESCRIPTION OF THE DRAWINGS

For a fuller understanding of the nature of the present invention, reference should be had to the following detailed description taken in connection with the accompanying drawings in which:

FIG. 1 is a perspective view of a collection assembly according to the present invention in a preferred embodiment, namely, in the form of a book structure.

FIG. 2 is a front plan view of a support structure according to the present invention in a preferred embodiment, namely, in the form of one of a plurality of pages which may be movably connected to the collection assembly illustrated in FIG. 1.

FIG. 3 is a front plan view of one of many possible demonstration pieces according to the present invention, the demonstration piece having informative indicia thereon.

Like reference numerals refer to like parts throughout the several views of the drawings.

DETAILED DESCRIPTION OF THE PREFERRED EMBODIMENTS

Figure 4:
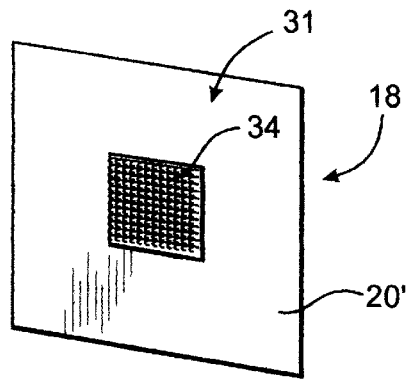
FIG. 4 is a rear perspective view of the demonstration piece illustrated in FIG. 3.

As shown in the accompanying Figures, the present invention is directed towards a communication and teaching system, generally indicated by the reference numeral 10, including a communication aid which is designed to improve the communication skills of non-verbal, speech impaired and/or language impaired individuals, and a method of implementing the inventive system, 10.

With initial reference to FIG. 1, the present invention comprises a collection assembly, which in a preferred embodiment is in the form of a book structure 12. Most preferably, the book structure 12 comprises a note-book having an openable and closable three-ring type of binder structure, although another type of book, note-book or even binder structure might be utilized. In any event, the preferred book structure of the collection assembly includes an outer or exterior cover 14 disposed in at least partially surrounding and enclosing relation to a plurality of support structures, 16, as shown in FIG. 1. In the preferred embodiment, the support structures 16 are in the form of a plurality of pages, each of which is preferably movably connected to the collection assembly 12, and in the most preferred embodiment, each of which may also be removable from the book structure, if and when that is desired. Also, and as illustrated in FIG. 2, each of the pages 16 have at least one exposed surface, 28, but preferably two oppositely disposed exposed surfaces, which define a display surface on which a number of "subject-related" demonstration pieces can be removably mounted. Thus, each of the afore-said pages is preferably structured to serve as a support structure for the storage, selective removal for display and subsequent re-storage of a plurality of demonstration pieces, as better depicted in FIG. 5. A sample of a single demonstration piece is illustrated in FIG. 3 and designated by reference numeral 18, and will now be described in more detail.

Figure 5:
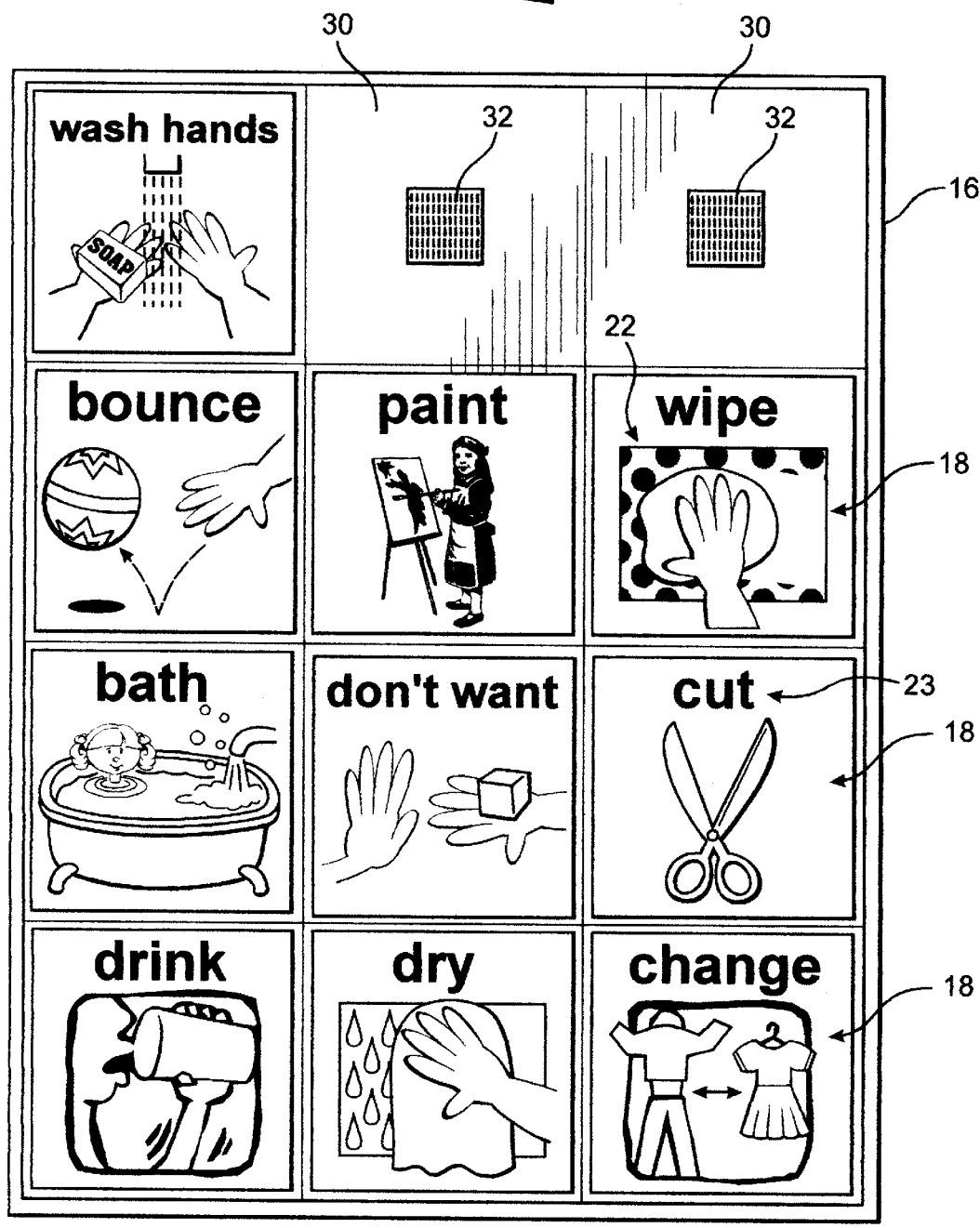
FIG. 5 is a front view of the support structure illustrated of FIG. 2 with a plurality of demonstration pieces, one of which is shown in FIG. 3, mounted thereon.
Figure 6:
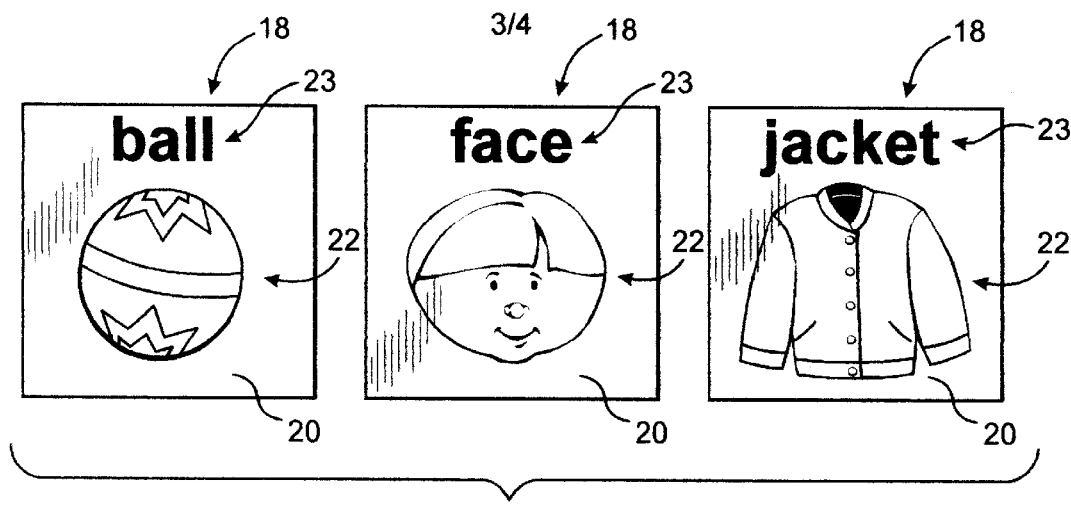
FIG. 6 is a front view of a plurality of other possible demonstration pieces in accordance with the present invention, which are by no means limited to the images depicted.
Figure 7:
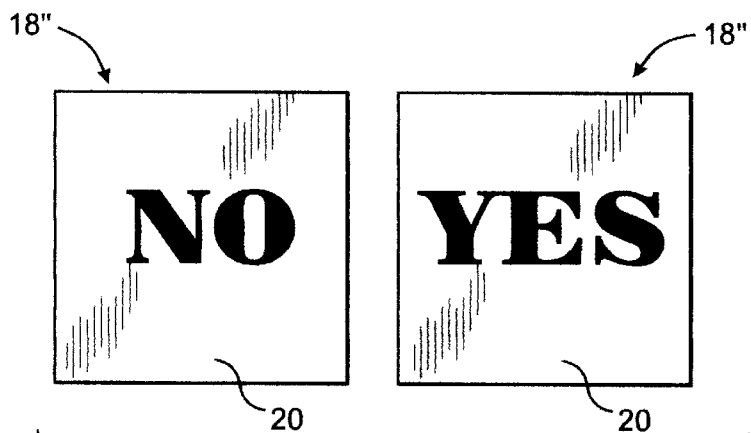
FIG. 7 is also a front view of a plurality of yet other demonstration pieces in accordance with the present invention which are again by no means limited to the words depicted.
Figure 8:
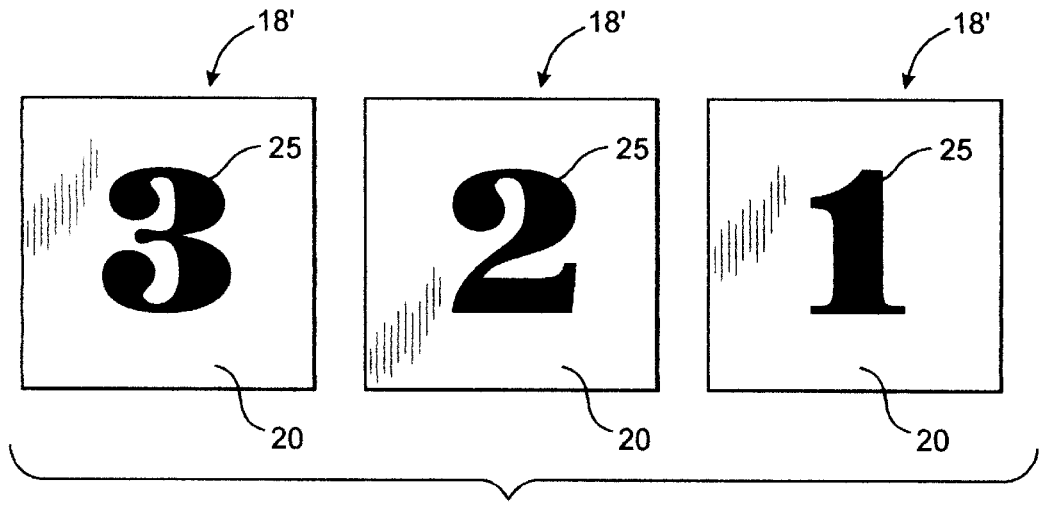
FIG. 8 is a front view of a plurality of yet additional demonstration pieces in accordance with the present invention which are again by no means limited to the numbers depicted.
Figure 9:
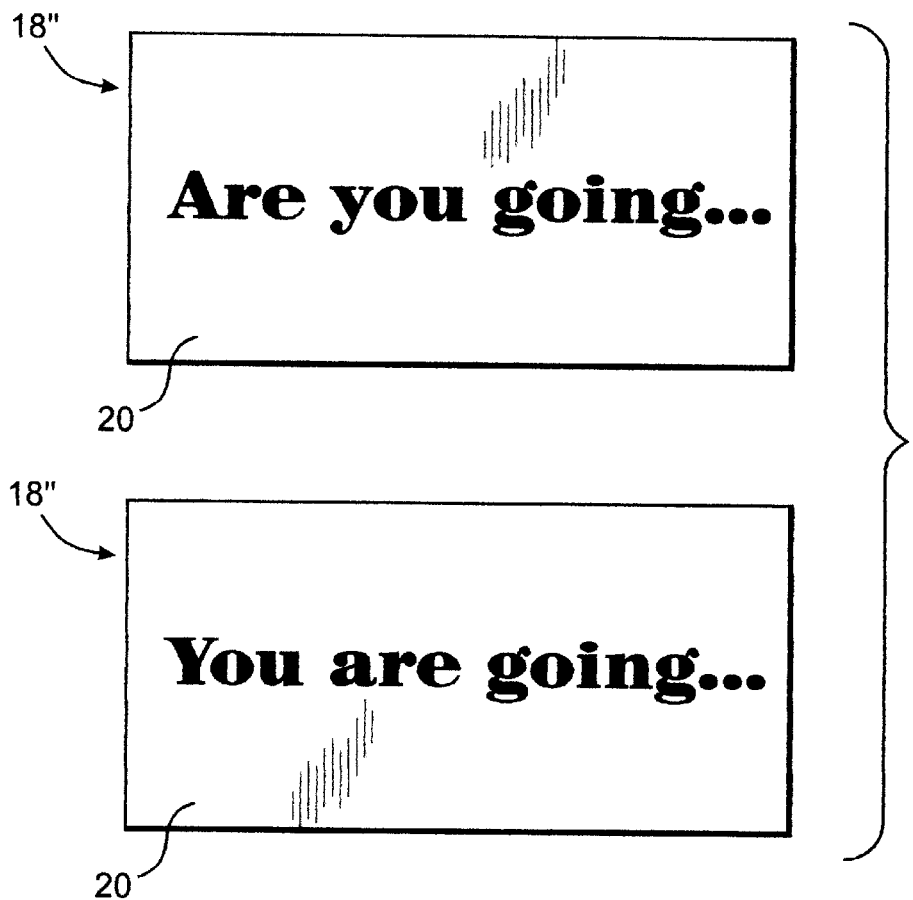
FIG. 9 is a front view of a plurality of yet additional demonstration pieces in accordance with the present invention which are by no means limited to the phrases depicted.
Figure 10:
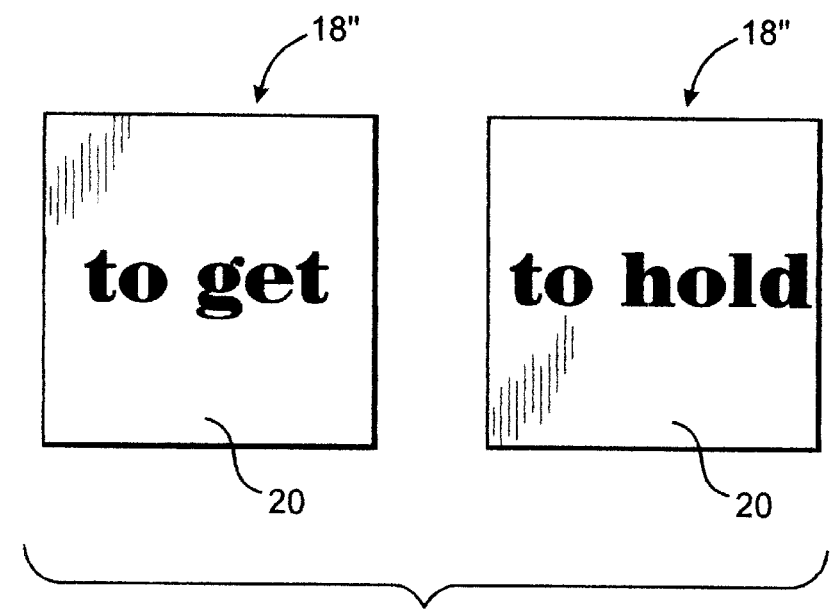
FIG. 10 is a front view of a plurality of yet additional demonstration pieces in accordance with the present invention which are by no means limited to the action verbs depicted.

The present invention also comprises a plurality of demonstration pieces, such as are generally indicated by reference numeral 18, 18' and 18" in FIGS. 3–10, which in a preferred embodiment are removably supported on at least one, but ideally a number of support structures such as pages, 16. Still referring to FIGS. 3–10, each of the demonstration pieces includes an exposed surface, 20, on which is formed one it of a variety of informative indicia, generally indicated by reference numeral 22. A feature of the present invention which makes the system 10 user-friendly and adaptable for a wide variety of communicatively impaired individuals is that the informative indicia 22 may be defined by a pictorial display or image, as best shown in FIGS. 3, 5 and 6 wherein a sketch, drawing, stick figure, photograph, product logo, etc. can be used either alone but preferably, in combination with descriptive writing, as indicated by reference numeral 23. In addition, the informative indicia may be defined by an alphabet letter or letters or any type of number or a plurality of numbers, as at 25 shown in FIG. 8, or a plurality of words and/or phrases as shown in FIGS. 7, 9 and 10. Each of the plurality of demonstration pieces 18, 18', 18", etc. is removably mounted on an exposed surface, 28, of one of the plurality of support structures or pages, 16. More preferably, each of the exposed surfaces 28 of the pages, 16, include a plurality of at least partially segregated areas, 30, best illustrated in FIGS. 2 and 5, which are disposed, dimensioned and configured to receive one of the plurality of demonstration pieces thereon. As has been described, it is preferable that both of the oppositely disposed exterior surfaces 28 of each of it, the plurality of pages 16 be used to removably support and display any one or a plurality of demonstration pieces 18 in an exposed manner. In the more preferred embodiment, however, the demonstration pieces 18 will be grouped by way of a particular subject, such as by way of example only, parts of the body, commonly used rooms within a house or building, common activities, articles of clothing, food items, places, etc., and then, one or more pages 16 of the collection assembly 12 may be devoted to a particular group, with the demonstration pieces 18 of that group all displayed on an exposed surface 28 of a page 16.

The present invention additionally comprises a mounting assembly, 31, which is structured and disposed to permit each demonstration piece 18 to be selectively and easily removed from and re-mounted on any one of the exposed display surfaces 28 of one or more of the pages 16. With reference to FIGS. 2 and 4, the mounting assembly 31 preferably comprises a first plurality of mounting components, 32, which are fixedly secured to the exposed display surfaces 28 of one or more of the pages 16, and most preferably, with each mounting component secured within one of the segregated areas 30, thereon. Each of the plurality of first mounting components 32 is also structured and disposed to removably attach or connect with each of a plurality of second mounting components, designated by reference numeral 34 in FIG. 4, which preferably, is secured to the rear surface 20' of each of the demonstration pieces 18. The first and second mounting components 32 and 34 may be defined by any conventional type connectors such as a re-usable adhesive, clip, snap, etc., it or may even be other cooperating male/female type structure formed for being held together. In the most preferred embodiment, however, the first and second mounting components 32 and 34 are defined by mating hook and loop type fasteners such as Velcro™, wherein adequate securement but yet removable attachment readily occurs.

Referring back to FIG. 1, the present invention further includes a primary display portion 15 which is preferably defined by an exterior cover 14 of the collection assembly or book structure 12. In the preferred embodiment and in implementing the present inventive system, this primary display portion 15 will serve as an "interactive" surface. In this regard, the primary display portion 15 will include a plurality of first mounting components 32, similar to those described with reference to FIG. 2, such that one or more of the demonstration pieces, such as 18, 18', 18", etc. may be selectively removed from the pages 16, and temporarily attached to the primary display portion 15, and arranged thereon in a cooperative array 19. The cooperative array 19 is defined by the arrangement of one or more of the demonstration pieces 18, 18', 18", etc., so as to permit the impaired individual, or even a therapist or another, to express or understand a communicative statement, question, etc., and it should be pointed out that the cooperative array 19 could be disposed in any of a number of it arrangements on the entire exterior cover 14 of the book it structure 12.

As an example of how one can communicate with this system, 10, the user can create and demonstratively present a communication such as, "I want ball," which can be accomplished by selecting the appropriate demonstration pieces, such as those shown in FIGS. 3 and 6. The two demonstration pieces which would make up this type of communication, both indicated as 18 in FIGS. 3 and 6, would first be located by the individual on the support structure or page 16 where each is generally kept, and then removed for subsequent placement in cooperative array 19 on the exposed surface or primary display portion 15 of the cover 14 of the book structure 12. Assuming for purposes of this example that the individual creating the "I want ball" message is speech and/or language impaired, then the person to whom that individual is trying to communicate with might provide the item, give a verbal response, gestural response, ask a question, or provide a combination of these. Of course, it is entirely possible that the individual creating the "I want ball" message is deaf or cannot comprehend verbal speech, and in that case, the person to whom that individual is trying to communicate with might provide a response or ask a question also by using the system 10 in the same manner as outlined herein. It should be pointed out as well, that two or more non-verbal or speech and/or language impaired individuals could readily communicate with each other using the system 10 in a similar manner as outlined herein.

In a more preferred embodiment, and still referring to FIG. 1, the primary display portion 15 defined by exterior cover 14 of the book structure 12 includes a separately designated area or segment, indicated by reference numeral 17, formed thereon. This separately designated area or segment 17 can be positioned as and have a size similar to that illustrated in FIG. 1 but could be positioned in other locations on the primary display portion 15 and have one of many different sizes, as well. The purpose of this separately designated segment 17 on the primary display portion 15 is to removably support and display, at least one demonstration piece which is being or which may be commonly referred to during a "conversation" between the impaired individual and another. Thereby, this separately designated area 17 will act as a boundary for teaching and conversational purposes and helps students to focus on responding or initiating during a conversation, and further, can aid a user with marking off quick responses, i.e., "YES," "NO," "MAYBE." By way of example, a demonstration piece having the word "NO," seen in FIG. 7, might be held in the separately designated segment 17 so as to adequately respond to a question. Thus, the separately designated segment 17 is intended to serve as an area to permit the user to quickly interact with others by giving him or her the ability to form immediate and/or repeated responses or questions.

Continuing with the description of the more preferred embodiment, the remaining surface of the primary display portion 15 can be used to display more complex or more detailed responses and questions, and for that purpose, may include structure thereon for providing an additional or second cooperative array 35, such as shown in FIG. 1. The second cooperative array 35 may be defined by a plurality of mounting components or connectors 33, which are identical to the first mounting components 32 secured to the exposed display surfaces 28 of the pages 16, which are fixedly secured to the primary display portion 15. Preferably, the mounting components 33 which make up the second cooperative array 35 are disposed in a relatively close and linear relationship to one another to permit the user to create one or more communications which are more in the nature of phrases, sentences and/or questions requiring more than, but not limited to, one word. Alternatively, the second cooperative array 35 may be defined by an elongated, preferably rectangular mounting strip having a front or exposed surface thereof structured and disposed to permit the removable connection of any one of a plurality of demonstration pieces 18, 18', 18", by way of second mounting components 34 disposed thereon. Again, a plurality of demonstration pieces could be mounted on the exposed surface of this elongated rectangular strip to similarly permit the it creation of a more detailed phrase or sentence. The elongated rectangular strip itself, could either be secured to the primary display portion 15 defined by exposed surface or cover 14 of the book structure 12 or could include structure on a back side thereof, such as a reusable adhesive, etc. or even mounting components similar to first mounting components 34, to permit selective temporary securing of the strip, with demonstration pieces mounted thereon, either directly to the exposed surface 14 or to any appropriately located connector 32 thereon, as shown in FIG. 1.

The communication system 10 of the present invention also allows the user to readily locate, access, and select appropriate ones of the plurality of demonstration pieces 18, 18' and 18" for purposes of creating a particular message in a relatively quick manner for presentation, preferably on the primary display portion 15 of the book structure 12. Accordingly, the communication system 10 of the present invention includes means for coding the demonstration pieces 18. More specifically, the book structure 12 is preferably structured and disposed to provide a plurality of grouped or segregated support structures or pages 16, so as to provide the user with a plurality of categorized demonstration pieces to choose from in creating a communication. Preferably, each category of demonstration pieces relates to a different subject matter which can include, but are not limited to, food items, kitchen items, body parts, clothing and accessories, bathroom it items or fixtures, calendar events, toys and entertainment devices, common objects, actions and occurrences, furniture, places, transportation vehicles, alphabet characters, numbers, people, etc. Still additional categories may be somewhat more sophisticated in that the informative indicia formed on the display surface of each of the demonstration pieces in these "more sophisticated" categories may be words or phrases which would require at least a minimal word recognition or reading level capability of the challenged individual utilizing these categories. The categories of such demonstrative pieces might include questions such as "who?," "what?," "where?," "when?," "why?," etc.; personal pronoun phrases such as "I have," "I want," "I need," "I am going," "I don't have," "I don't want," etc.; request phrases such as "read me," "show me," "get me," "help me," etc.; pronoun phrases and/or prepositional phrases, etc. In a preferred embodiment, one or more support structures, such as one page or a group of adjacent pages 16 would be devoted to a particular category, such as one of the types set forth above, with each of the demonstration pieces associated with that particular category mounted on that particular page or pages 16 in the manner previously described. Most of the demonstration pieces within the system 10, will ideally be "subject related" and located within one of the given subject category or groupings. To enable the user to readily locate a particular category of "subject related" demonstration pieces, in the preferred embodiment the book structure 12 may include a number of tabbed dividers, each tab being structured and disposed to display and/or to carry the title of the particular subject category, although in another preferred embodiment, the support structures or pages 16 may include a readily visible tab or other marking which displays and/or carries the title of the particular subject category.

In a most preferred embodiment, however, the means for coding the demonstration pieces 18 preferably comprises a color coding system, and/or a coding system entailing symbols. In the embodiment utilizing color coding only, for example, each of the support structures or pages 16 or group thereof that represents one of the plurality of subject categories would be marked with a different color. For example, the subject category of "food items" might be selected to be the color orange, whereas the subject category for body parts might be yellow and that for bathroom items might be blue, and so on. Accordingly, and carrying on with this example, the support structure or pages 16 devoted to the category of "food items" might be entirely colored orange or possibly, only the tab or other visible marking thereof might be colored orange, and similarly for the "body parts" category or that for bathroom items, which would have their own designated color. It would also be preferable for each demonstration piece relating to this subject category to also display or to be marked with the same selected color. Therefore, when either the challenged individual or one attempting to communicate with him or her or to teach such an individual desires to express a communicative statement, he or she can readily locate and access the demonstration pieces of that category which is related to the targeted subject for communication, if desired, also by the inclusion of a master index to each category, but more preferably, by way of an easily identifiable and memorable color coded category. In addition, because subject related ones of the demonstration pieces would all have the same color marked thereon as an identifying color code, the different informative indicia thereon would be more easily identifiable and accessible by the challenged individual. This preferred feature would further assist the user of the system with re-storing the various demonstration pieces 18, 18', 18" when a "conversation" or interaction with another has ended.

It should be pointed out that although the coding means for the demonstration pieces 18 are most preferably a color coding system, described above, it may be possible to run out of suitable colors for effective use. It is also possible that the impaired individual using the system is color blind. Thus, it is within the scope of the present invention to also employ the use of symbols for coding means in addition to color as a coding means, which might be used either separately or in combination with color. Symbols such as, but not limited to, shapes like stars, triangles, squares, circles, etc. and other icons can be used for such additional coding means. By way of example, this feature might also be helpful should a teacher, speech-language pathologist and/or occupational therapist desire to go over a particular or more specialized topic with the impaired individual, in that he or she can prepare and include an extra section in the book structure 12 of this invention which is devoted to that particular topic or lesson, and might prepare and include demonstration pieces with indicia thereon relating to that topic or lesson, so as to simply add to already existing categories within the book structure 12. For instance, a separate or additional category might be added which is devoted to the subject of cooking and that category might have its own special code and/or symbol with indicia corresponding to this category and the code selected.

It will be understood that a conversation can take place on a wide variety of topics. As such another feature of the present invention is to allow the user(s) of the communication system 10 to create demonstration pieces 18 of his/her/their own, on subjects which are not provided for on the system 10, as supplied to the user. Thus, a user's desire to create a communicative statement, question, answer, etc. on a favorite or specialized type of hobby or interest can be accommodated and in this regard, it is contemplated that a number of empty demonstration pieces can be provided with the system 10 which can be imprinted with words, images, etc. and colored or symbolized by their corresponding category, to permit customization. In this manner, the individual's receptive and/or expressive vocabulary, syntax, and functional pragmatic skills will likely thereby be expanded in that he/she has the ability and the motivation to create his or her own customized communications. In a similar vein, the demonstration pieces and support structures of the book structure 12 might be designed so as to be more customized to the challenged individual's particular impairment. By way of example only, if the individual does not have the motor coordination to manually manipulate either the demonstration pieces or the support structures, the size, thickness and/or shape of either can be modified. As another example, if the user is somewhat visually impaired, then the size of the informative indicia carried by each demonstration piece can also be larger or increased.

Also because a conversation can take place on a wide variety of topics, the communication system 10 of the present invention may well comprise a large number of "subject categories", each devoted to a plurality of categorized demonstration pieces which the user may choose from in creating a communication. As such, in another preferred embodiment the present invention will comprise at least one other collection assembly, also preferably in the form of a book structure 12, and ideally, a note-book having an openable and closable ring type of binder structure. This second book structure will preferably be utilized as a storage means, and as such, should also comprise a plurality of grouped or segregated support structures or pages 16, each of which may be devoted to, but are not necessarily devoted to, additional or less-frequently-used "subject related" categories of demonstration pieces. The support structures of this second book structure may be similar to the pages 16 with at least one exposed display surface 28, as described previously, but will preferably comprise page-like and/or page-sized compartments that provide an openable and closable pouch, of the type made of plastic or another material which can be closed by way of a zipper like structure, snaps, Velcro™, etc. Each of the support structures of this second book are preferably also capable of including and will include and correspond to one or more of the coding means described with reference to the main book structure 12, so as to allow the user to readily locate a particular group of subject related demonstration pieces. Thus, a plurality of demonstration pieces can be conveniently grouped together and stored therein, without displaying each individually, if that is desired. Also, unlike the main book structure 12 depicted in FIG. 1, this second book structure would not need to include any type of display 14 portion, such as primary display portion 15 and/or mounting components 32 thereon, although it would certainly be within the scope of the invention to provide the same, if desired. It should similarly be noted that the main book structure 12 depicted in FIG. 1 might additionally comprise one or more of the alternative types of support structures, described above with reference to the second book structure, so as to provide some additional storage compartments for a plurality of demonstration pieces.

In a more preferred embodiment, the collection assembly or book structure 12 of the present invention additionally comprises at least one holding area for a plurality of demonstration pieces 18, 18' or 18". In a preferred embodiment, the holding area is defined by one of the support structures or pages, 16, within book structure 12, although both a front side and a back side of such a page or even more than one such page could be used for this purpose, if desired. Ideally, the holding area is structured and disposed to be the first of the plurality of pages, 16' as illustrated in FIG. 1. In an alternative preferred embodiment, the holding area could be defined as the interior surface 13 of the outer cover 14 of the book structure 12. In any embodiment, the holding area would also include a number of first mounting components 32 disposed thereon, and indeed, an exposed surface 28 of page 16' may be formed to include one or more first mounting components 32 so as to be capable of receiving and holding a number of demonstration pieces 18, 18', 18", such as those that have already been used to form a communication during a "conversation" and must thereafter be returned to their proper subject related category. In such a manner, when an ongoing "conversation" is taking place, a user need not always immediately return to one of the subject devoted pages 16 in order to replace a demonstration piece 18, 18', 18." In that situation, the holding area is used as a temporary storage place. It should be pointed out that the holding area will preferably also be used as a permanent storage place for certain demonstration pieces that are repeatedly or commonly used during a "conversation" and/or for demonstration pieces which may not be readily classified into a particular category. Examples of the latter might be demonstration pieces such as "YES," "NO," "I WANT," etc. Further, this holding area and/or pages of the holding area preferably does not have any coding means, so as to avoid confusion.

Since many modifications, variations and changes in detail can be made to the described preferred embodiment of the invention, it is intended that all matters in the foregoing description and shown in the accompanying drawings be interpreted as illustrative and not in a limiting sense. Thus, the scope of the invention should be determined by the appended claims and their legal equivalents.

Now that the invention has been described,

What is claimed is:

1. A communication aid for an impaired individual comprising:

a) a collection assembly including a plurality of support structures segregated into a plurality of categories, each category representative of a different subject matter, b) a plurality of demonstration pieces each having an exposed surface including informative indicia formed thereon, c) each of said support structures comprising a display surface formed thereon which is structured and disposed to removably mount a number of subject related ones of said plurality of demonstration pieces thereon, each of said subject related demonstration pieces oriented to display said exposed surface thereof for viewing of said informative indicia thereon, d) each of said display surfaces of said support structures comprising a plurality of at least partially segregated areas each dimensioned and configured to receive one of said subject related demonstration pieces; said segregated areas collectively arranged to display said subject related demonstration pieces on said display surface in a predetermined, organized manner, e) said collection assembly including at least one primary display portion structured to removably support at least one of said plurality of demonstration pieces thereon in a cooperative array, f) said informative indicia of at least one demonstration piece which comprises said cooperative array defining a communication created at least in part by the impaired individual, and g) each of said plurality of support structures including code means for identifying a number of said plurality of subject related demonstration pieces, as being representative of one grouping of subject related demonstration pieces.

2. A communication aid as recited in claim 1 wherein said plurality of support structures are secured to said collection assembly in movable relation to one another and are cooperatively structured to have said display surface thereof selectively exposed for viewing of said subject-related demonstration pieces thereon.

3. A communication aid for an impaired individual comprising:

a) a collection assembly including a plurality of support structures segregated into a plurality of categories, each category representative of a different subject matter, b) a plurality of demonstration pieces each having an exposed surface including informative indicia formed thereon, c) each of said support structures comprising a display surface formed thereon which is structured and disposed to removably mount a number of subject-related ones of said plurality of demonstration pieces thereon, each of said subject-related demonstration pieces oriented to display said exposed surface thereof for viewing of said informative indicia thereon, d) said collection assembly including at least one primary display portion structured to removably support at least one of said plurality of demonstration pieces thereon in a cooperative array, e) said informative indicia of said at least one demonstration piece which comprises said cooperative array defining a communication created at least in part by the impaired individual, f) said informative indicia on at least some of said plurality of demonstration pieces comprising alphanumeric displays and said alphanumeric displays on said subject related ones of said plurality of demonstration pieces all being representative of one of said plurality of categories, and g) each of said plurality of support structures including code means for identifying a number of said plurality of subject-related demonstration pieces as being representative of one grouping of subject-related demonstration pieces.

4. A communication aid as recited in claim 3 wherein said code means is additionally formed on said plurality of demonstration pieces for identifying each of said number of subject-related demonstration pieces as being representative of one of said plurality of categories.

5. A communication aid as recited in claim 4 wherein said plurality of support structures and said number of subject-related demonstration pieces have equivalent code means formed thereon which are representative of a common one of said plurality of categories.

6. A communication aid as recited in claim 5 wherein said code means comprises color coding of said plurality of support structures and said plurality of demonstration pieces.

7. A communication aid as recited in claim 5 wherein said code means comprises symbol coding of said plurality of support structures and said plurality of demonstration pieces.

8. A communication aid as recited in claim 3 wherein said informative indicia on at least some of said plurality of demonstration pieces comprises pictorial representations and said pictorial representations on said subject-related ones of said plurality of the demonstration pieces are all representative of one of said plurality of categories.

9. A communication aid as recited in claim 3 further including a plurality of first mounting components attached to said plurality of support structures and a plurality of second mounting components each being attached to a different one of said demonstration pieces, said first and second mounting components cooperatively structured to permit removable attachment of said plurality of said demonstration pieces to said plurality of support structures.

10. A communication aid as recited in claim 3 further comprising a second collection assembly having a plurality of support structures for additional demonstration pieces.

11. A communication aid as recited in claim 3 wherein said collection assembly further comprises at least one holding area structured and disposed for storage of a relatively small number of demonstration pieces.

12. A communication aid for an impaired individual comprising:

a) a collection assembly including a plurality of support structures segregated into a plurality of categories, each category representative of a different subject matter, b) a plurality of demonstration pieces each having an exposed surface including informative indicia formed thereon, c) each of said support structures comprising a display surface formed thereon which is structured and disposed to removably mount a number of subject-related ones of said plurality of demonstration pieces thereon, each of said subject-related demonstration pieces oriented to display said exposed surface thereof for viewing of said informative indicia thereon, d) said collection assembly including at least one primary display portion structured to removably support at least one of said plurality of demonstration pieces thereon in a cooperative array, e) said informative indicia of said at least one demonstration piece which comprises said cooperative array defining a communication created at least in part by the impaired individual, f) each of said plurality of support structures including code means for identifying a number of said plurality of subject-related demonstration pieces as being representative of one grouping of subject-related demonstration pieces, and g) said primary display portion of said collection assembly including a separately designated response segment formed thereon and structured to removably support at least one of said plurality of demonstration pieces having informative indicia thereon.

13. A communication and teaching aid for a non-verbal, speech and/or language impaired individual comprising:

a) a collection assembly at least partially defined by a note-book structure including a plurality of pages removably mounted to said note-book structure and movably mounted relative to one another and segregated into a plurality of categories, b) a plurality of demonstration pieces each having an exposed surface with informative indicia formed thereon, c) each of said pages defining a support structure for at least some of said plurality of demonstration pieces and including at least one display surface structured to removably support a number of subject-related ones of said plurality of demonstration pieces thereon, d) said informative indicia on at least one of said plurality of demonstration pieces comprising alphanumeric displays and said alphanumeric displays on said subject related ones of said plurality of demonstration pieces all being representative of one of said plurality of categories, e) said note-book structure including at least one primary display portion structured to removably support at least one of said plurality of demonstration pieces thereon in a cooperative array so as to expose said informative indicia thereon, f) said informative indicia of said at least one of said demonstration pieces which comprise said cooperative array defining an expressive communication created at least in part by the individual, and g) code means formed on said plurality of pages for identifying each of said plurality of pages as being representative of one of said plurality of categories.

14. A communication and teaching aid as recited in claim 13 wherein said informative indicia on at least one of said plurality of demonstrative pieces comprises pictorial representations and said pictorial representations on said subject-related ones of said plurality of demonstration pieces are all representative of one of said plurality of categories.

15. A communication and teaching aid as recited in claim 14 wherein said informative indicia on others of said plurality of demonstration pieces further comprises alpha-numeric displays, said alpha-numeric displays on said subject-related ones of said plurality of demonstration pieces are all representative of one of said plurality of categories.

16. A communication and teaching aid as recited in claim 13 wherein said code means is formed on said plurality of demonstration pieces for identifying each of said subject-related demonstration pieces as being representative of one of said plurality of categories.

17. A communication aid as recited in claim 16 wherein said plurality of pages and said plurality of demonstration pieces have equivalent code means formed thereon and are representative of a common one of a said plurality of categories.

18. A communication aid as recited in claim 17 wherein said code means comprises color coding of said plurality of pages and said plurality of demonstration pieces.

19. A method of improving the communication skills of a nonverbal, speech and/or language impaired individual comprising the steps of:

a) creating a plurality of demonstration pieces each having informative indicia formed on an exposed portion thereof, b) grouping each of said plurality of demonstration pieces into a plurality of categories based on said informative indicia thereof being subject-related, c) identifying the plurality of demonstration pieces by category by coding each of said plurality of demonstration pieces having the same subject-related informative indicia thereon with the same code, d) storing said plurality of demonstration pieces by segregated category and providing visual and physical access to each of the plurality of demonstration pieces of each category by the individual, e) allowing the individual to select and display at least one of the plurality of demonstration pieces in a cooperative array, and f) creating an expressive communication at least in part by the individual by utilizing the informative indicia of said at least one of the plurality of demonstration pieces in it the cooperative array.

20. A method as recited in claim 19 further comprising the step of coding the plurality of demonstration pieces by using colors.

21. A method as recited in claim 20 further comprising the step of defining the informative indicia on at least one of said plurality of demonstration pieces by pictorial representations.

22. A method as in recited in claim 21 further comprising the step of defining the informative indicia of other of said plurality of demonstration pieces by alpha-numeric display.

* * * * *